United States Patent
Anderson et al.

(10) Patent No.: US 10,293,713 B2
(45) Date of Patent: May 21, 2019

(54) CHILD-RESTRAINT HARNESS

(71) Applicant: Dorel Juvenile Group, Inc., Foxboro, MA (US)

(72) Inventors: Robert S. Anderson, Narvon, PA (US); David A. Lehman, Lancaster, PA (US); Mei-Hui Lin, Nashville, IN (US)

(73) Assignee: Dorel Juvenile Group, Inc., Foxboro, MA (US)

(*) Notice: Subject to any disclaimer, the term of this patent is extended or adjusted under 35 U.S.C. 154(b) by 0 days.

(21) Appl. No.: 15/786,997

(22) Filed: Oct. 18, 2017

(65) Prior Publication Data

US 2018/0326875 A1    Nov. 15, 2018

Related U.S. Application Data

(60) Provisional application No. 62/409,956, filed on Oct. 19, 2016.

(51) Int. Cl.
| | | |
|---|---|---|
| *B60N 2/26* | (2006.01) | |
| *B60N 2/28* | (2006.01) | |
| *B60R 22/10* | (2006.01) | |

(52) U.S. Cl.
CPC .......... *B60N 2/2812* (2013.01); *B60N 2/286* (2013.01); *B60R 22/105* (2013.01)

(58) Field of Classification Search
CPC ...... B60N 2/2812; B60N 2/286; B60R 22/105
USPC .................................. 297/216.11, 484, 250.1
See application file for complete search history.

(56) References Cited

U.S. PATENT DOCUMENTS

| | | | |
|---|---|---|---|
| 4,063,777 A | 12/1977 | Takada | |
| 4,232,895 A | 11/1980 | Yoshio et al. | |
| 4,682,791 A * | 7/1987 | Ernst ..................... | B60R 22/185 |
| | | | 280/806 |
| 4,886,318 A | 12/1989 | Pennock | |
| 4,929,027 A | 5/1990 | Beauvias | |
| 5,054,815 A | 10/1991 | Gavagan | |
| 5,335,957 A | 8/1994 | Golder | |
| 5,580,126 A | 12/1996 | Sedlack | |
| 6,086,158 A | 7/2000 | Zeoli | |
| 6,145,881 A | 11/2000 | Miller et al. | |
| 6,338,529 B1 | 1/2002 | Bapst et al. | |
| 6,471,298 B2 | 10/2002 | Carine et al. | |
| 6,474,735 B1 | 11/2002 | Carnahan et al. | |
| 6,543,847 B2 | 4/2003 | Balensiefer | |
| 7,350,862 B2 | 4/2008 | Fransen et al. | |
| 7,445,286 B2 | 11/2008 | Siewersten et al. | |
| 7,506,929 B2 * | 3/2009 | Fransen ............... | B60N 2/2812 |
| | | | 297/216.11 |
| 7,735,919 B2 | 6/2010 | Chen et al. | |
| 8,038,214 B2 | 10/2011 | Brandl et al. | |
| 8,146,946 B1 | 4/2012 | Emond | |
| 8,272,689 B2 * | 9/2012 | Biaud .................. | B60N 2/2812 |
| | | | 297/250.1 |
| 8,348,337 B2 | 1/2013 | Franck et al. | |
| 8,550,567 B2 * | 10/2013 | Biaud .................. | B60N 2/2812 |
| | | | 297/250.1 |
| 8,573,693 B2 * | 11/2013 | Gaudreau, Jr. ...... | B60N 2/2821 |
| | | | 297/250.1 |
| 8,622,478 B2 | 1/2014 | Spence | |

(Continued)

*Primary Examiner* — Rodney B White
(74) *Attorney, Agent, or Firm* — Barnes & Thornburg LLP

(57) ABSTRACT

A child-restraint harness is coupled to a juvenile vehicle seat and arranged to restrain a child seat in the juvenile vehicle seat. The child-restraint harness includes first and second shoulder straps.

14 Claims, 2 Drawing Sheets

(56) References Cited

U.S. PATENT DOCUMENTS

| | | | |
|---|---|---|---|
| 8,764,108 B2* | 7/2014 | Gaudreau, Jr. | B60N 2/2812 297/250.1 |
| 8,777,322 B2 | 7/2014 | Horton et al. | |
| 8,801,096 B2* | 8/2014 | Brunick | B60N 2/2851 297/250.1 |
| 9,022,471 B2* | 5/2015 | Gaudreau, Jr. | B60N 3/101 297/216.11 |
| 9,586,505 B2* | 3/2017 | Morgenstern | B60N 2/2812 |
| 2001/0013719 A1* | 8/2001 | Carine | B60N 2/2806 297/484 |
| 2006/0103229 A1 | 5/2006 | Fransen et al. | |
| 2012/0146369 A1* | 6/2012 | Gaudreau, Jr. | B60N 2/2809 297/216.11 |
| 2014/0265489 A1 | 9/2014 | Morgenstern | |

* cited by examiner

_US 10,293,713 B2_

CHILD-RESTRAINT HARNESS

PRIORITY CLAIM

This application claims priority under 35 U.S.C. § 119(e) to U.S. Provisional Application No. 62/409,956, filed Oct. 19, 2016, which is expressly incorporated by reference herein.

BACKGROUND

The present disclosure relates to child restraints, and particularly to child restraints that are adapted to be used in a vehicle. More particularly, the present disclosure relates to a child restraint having shoulder straps to restrain a child on a juvenile vehicle seat configured to set on a vehicle passenger seat.

SUMMARY

A child restraint in accordance with the present disclosure includes a juvenile vehicle seat and a child-restraint harness coupled to the juvenile vehicle seat. In illustrative embodiments, the child-restraint harness includes first and second shoulder straps adapted to wrap over the shoulders of a child seated in the juvenile vehicle seat.

In illustrative embodiments, the child restraint further includes a harness tightener comprising first fulcrum strip coupled to the first shoulder strap and a second fulcrum strip coupled to the second shoulder strap. Each fulcrum strip is configured to embrace one shoulder of a child seated on the juvenile vehicle seat. Each fulcrum strip is relatively rigid to maintain its predetermined shape during exposure to forces applied by the shoulder of the child as the shoulder moves away from a seat back of the juvenile vehicle seat during exposure of the juvenile vehicle shape to external forces (e.g. frontal impact).

In illustrative embodiments, the first fulcrum strip of the harness tightener is mounted on a forward facing portion of the seat back of the juvenile vehicle seat for upward movement away from a seat bottom of the juvenile vehicle seat from a lowered position to a raised position to apply tension to the first shoulder strap during exposure of the juvenile vehicle seat to an external impact force. Tensioning of the first shoulder strap causes lateral movement of the first shoulder strap relative to the seat back of the juvenile vehicle seat to be minimized so that lateral movement of the shoulders of a child seated on the juvenile vehicle seat away from the seat back of the juvenile vehicle seat is limited. Similarly, the second fulcrum strip is mounted on a forward facing portion of the seat back and arranged to apply tension to the second shoulder strap when the second fulcrum strip moves upwardly away from the seat bottom from a lowered position to a raised position during exposure of the juvenile vehicle seat to the external impact force. It is within the scope of the present disclosure to arrange the first and second fulcrum strips to apply tension to the companion first and second shoulder belts by moving the fulcrum strips to push or pull upwardly on neighboring portions of the shoulder straps.

In illustrative embodiments, each fulcrum strip of the harness tightener is L-shaped and includes a short front leg arranged to extend downwardly to embrace a forwardly facing portion of the shoulder of a child seated on the juvenile vehicle seat and restrained in that seat by the child-restraint harness. Each fulcrum strip also includes a relatively longer top leg having a forward section coupled to an upper end of the short front leg and arranged to extend forwardly to embrace an upwardly facing portion of the shoulder of a child seated on the juvenile vehicle seat. Each longer top leg also includes a rearward end mounted on the seat back of the juvenile seat at a horizontal strip-pivot axis to support the fulcrum strip for pivotable movement about the horizontal strip-pivot axis between a lowered position associated with an untensioned companion shoulder strap and a raised position associated with a tensioned companion shoulder strap.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed disclosure particularly refers to the accompanying figures in which.

DETAILED DESCRIPTION

Figure 1:
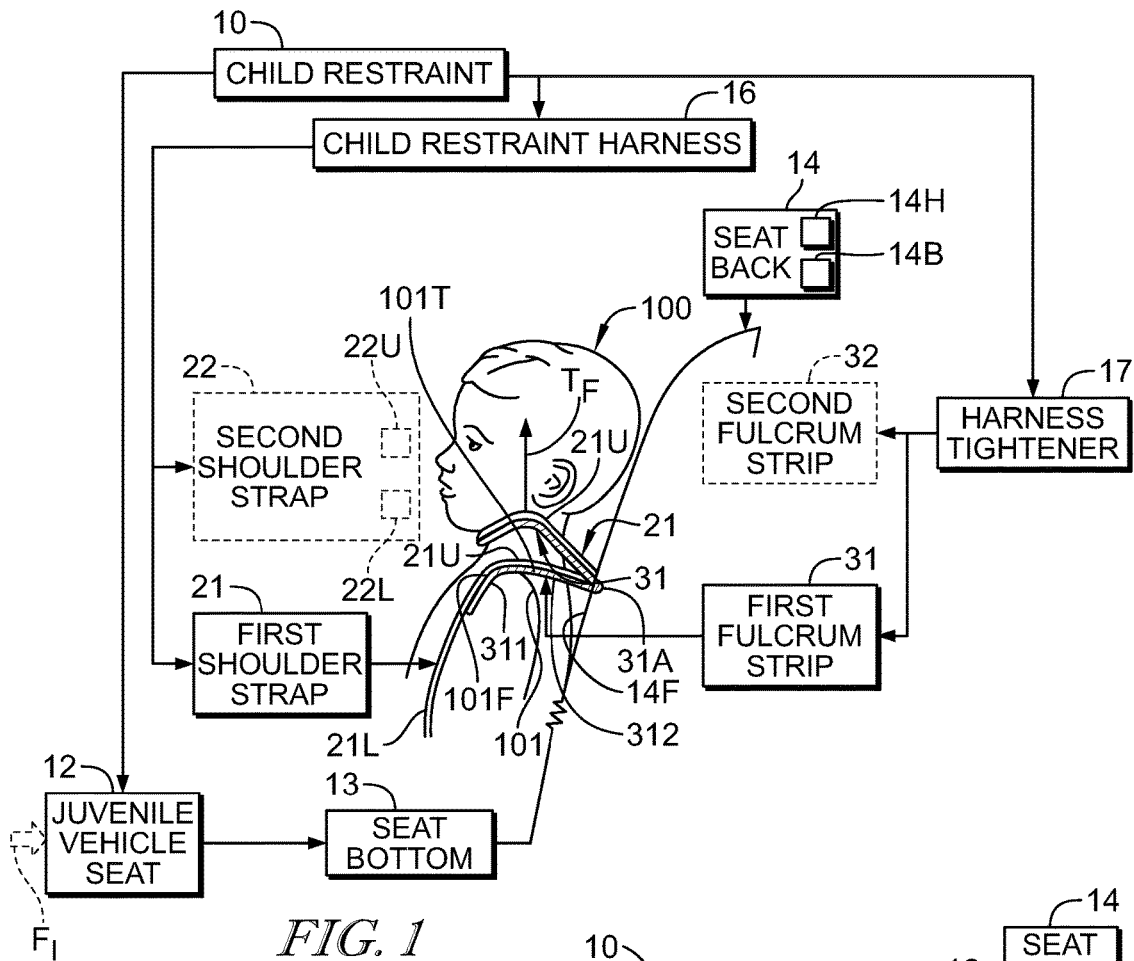
FIG. 1 is a side elevation view of an illustrative first fulcrum strip of a harness tightener in accordance with the present disclosure and showing that the first fulcrum strip is associated with a first shoulder strap of a child-restraint harness and is mounted on a forward facing portion of the seat back of a companion juvenile vehicle seat for pivotable movement about a horizontal strip-pivot axis from a lowered position (shown in solid) to a raised position (shown in phantom) to apply a tension to the first shoulder strap sufficient to retain the shoulders of a child seated in the juvenile vehicle seat in contact with or in close proximity to the seat back and also showing diagrammatically that the child-restraint harness includes a second shoulder strap and a second fulcrum strip associated with the second shoulder strap.
Figure 3:
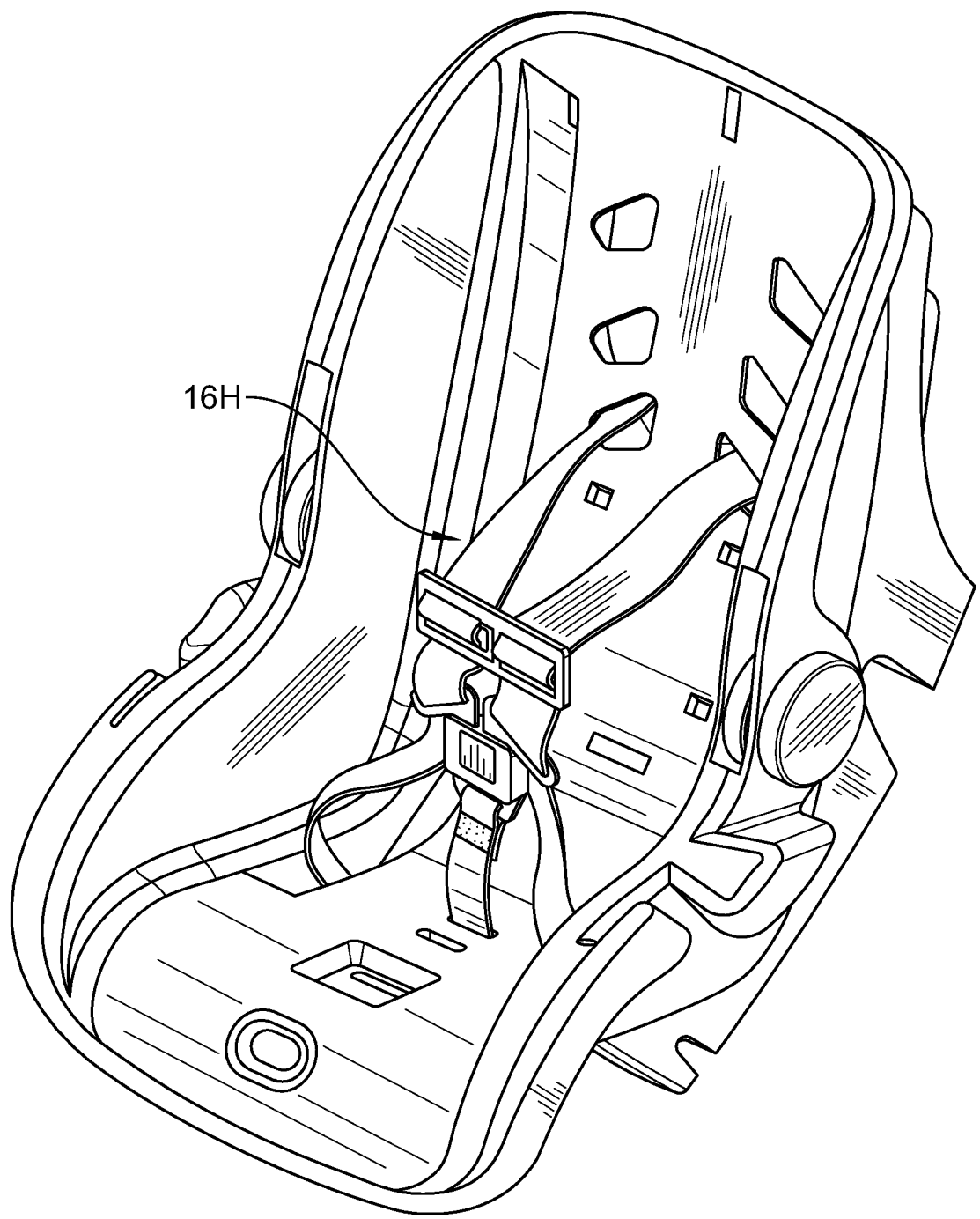
FIG. 3 is a perspective view of an illustrative juvenile vehicle seat carrying a five-point child-restraint harness having first and second shoulder straps.

A child restraint 10 includes a juvenile vehicle seat 12 having a seat bottom 13 and a seat back 14 as suggested in FIG. 1. Child restraint 10 also includes a child-restraint harness 16 coupled to seat back 14 as suggested in FIG. 1. In illustrative embodiments, child-restraint harness 16 is a five-point harness assembly 16H shown in FIG. 3 and described along with a companion juvenile vehicle seat in U.S. Pat. No. 6,543,847, the entire disclosure of which is hereby incorporated by reference herein.

Child-restraint harness 16 comprises a first shoulder strap 21 coupled to seat back 14 as suggested in FIG. 1. First shoulder strap 21 is arranged to wrap over a first shoulder 101 of a child 100 seated in juvenile vehicle seat 12 as suggested in FIG. 1 to assist in restraining child 100 in a seated position in juvenile vehicle seat 12. A second shoulder strap 22 (shown diagrammatically in FIG. 1) is arranged to lie in spaced-apart relation to first shoulder strap 21 and wrap over an opposite second shoulder (not shown) of the child 100 seated in juvenile vehicle seat 12.

Child restraint 10 also includes a harness tightener 17 that is associated with and linked to child-restraint harness 16 in accordance with the present disclosure as shown, for example, in FIG. 1. In illustrative embodiments, harness tightener 17 is interposed between a shoulder of a seated child 100 and upper portions of one or both of first and second shoulder straps 21, 22 of child-restraint harness 16. Harness tightener 17 is configured to provide means for lifting (e.g. pushing or pulling) the upper portions 21U, 22U of the shoulder straps 21, 22 upwardly away from seat bottom 13 of juvenile vehicle seat 12 to move lower portions 21L, 22L of shoulder straps 21, 22 closer to seat back 14 of juvenile vehicle seat 12 to tighten shoulder straps against the upper torso of the seated child so as to restrain the upper torso of the seated child in response to application of an external impact force $F_I$ to juvenile vehicle seat 12 as suggested in FIG. 1.

Harness tightener 17 comprises a first fulcrum strip 31 coupled to first shoulder strip 21 in an illustrative embodiment of the present disclosure as suggested in FIG. 1. First fulcrum strip 31 is arranged to move relative to juvenile vehicle seat 12 and away from seat bottom 13 from a lowered position (shown in solid) to a raised position (shown in phantom) as suggested in FIG. 1 during exposure of juvenile vehicle seat 12 to an external impact force $F_I$ diagrammatically shown in FIG. 1. A second fulcrum strip 32 similar to first fulcrum strip 31 is also included in harness tightener 17 and coupled to second shoulder strap 22 in the same manner as first fulcrum strip 31 is coupled to first shoulder strap 21.

Figure 1A:
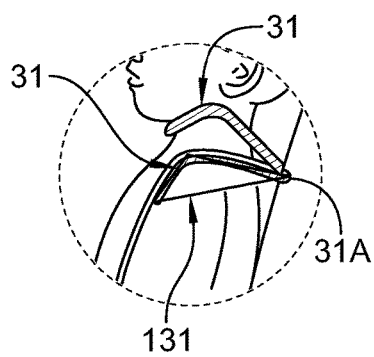
FIG. 1A is a view of a portion of the child restraint shown in FIG. 1 suggesting that the first fulcrum strip of the harness tightener has an L-shaped profile that is aligned with two upwardly facing surfaces of an imaginary isosceles triangle.

First fulcrum strip 31 of harness tightener 17 has an L-shaped profile as suggested in FIG. 1. First fulcrum strip 31 is made of a relatively rigid material to maintain that L-shaped profile during movement relative to seat back 14 from the lowered position to the raised position as suggested in FIG. 1. Second fulcrum strip 32 has a similar L-shaped profile and is also made of a relatively rigid material. Each L-shaped profile is aligned as suggestive in FIG. 1A with two upwardly facing perimeter surfaces of an imaginary isosceles triangle 131.

Each fulcrum strip 31, 32 of harness tightener 17 in accordance with the present disclosure is configured to provide strap-tensioner means located in front of seat back 14 and above seat bottom 13 for applying tension to its companion shoulder strap 21 or 22 during exposure of the juvenile vehicle seat 12 to an external impact force $F_I$ so that the child 100 seated in juvenile vehicle seat 12 and restrained by the shoulder straps 21, 22 remains substantially in an upright positon in contact with or closely confronting relation to seat back 14 as suggested in FIG. 1. In illustrative embodiments, each fulcrum strip 31, 32 is moved relative to seat back 14 and upwardly away from seat bottom 13 from the lowered position to the raised position as suggested in FIG. 1 during exposure of the juvenile vehicle seat 12 to an external impact force $F_I$. In illustrative embodiments, seat back 14 includes a backrest 14B and a movable headrest 14H mounted on backrest 14B and fulcrum strips 31, 32 of harness tightener 17 are pivotably mounted on backrest 14B. It is within the scope of the present disclosure alternatively to mount fulcrum strips 31, 32 for pivotable movement on headrest 14H.

In illustrative embodiments, first fulcrum strip 31 of harness tightener 17 is mounted on seat back 14 of juvenile vehicle seat 12 for upward movement away from seat bottom 13 of juvenile vehicle seat 12 from a lowered position to a raised position as suggested in FIG. 1 to apply tension to first shoulder strap 21 during exposure of juvenile vehicle seat 12 to an external impact force $F_I$. Tensioning of first shoulder strap 21 causes lateral movement of first shoulder strap 21 toward and away from seat back 14 of juvenile vehicle seat 12 to be minimized so that lateral movement of the shoulder 101 of a child 100 seated on juvenile vehicle seat 12 away from seat back 14 of juvenile vehicle seat 12 is limited. Similarly, the second fulcrum strip 32 is arranged to apply tension to second shoulder strap 22 when second fulcrum strip 32 moves upwardly away from seat bottom 13 from a lowered position to a raised position during exposure of juvenile vehicle seat 12 to the external impact force $F_I$.

In illustrative embodiments, first fulcrum strip 31 of harness tightener 17 is L-shaped and includes a short front leg 311 that is coupled to a lower portion 21L of first shoulder strap 21 and arranged to extend downwardly to embrace a forwardly facing front portion 101F of the shoulder 101 of a child 100 seated on juvenile vehicle seat 12 and restrained in that seat 12 by child-restraint harness 16 as suggested in FIG. 1. First fulcrum strip 31 also includes a relatively longer top leg 312 having a forward section coupled to an upper end of the short front leg 311 and coupled to an upper portion 21U of first shoulder strap 21 and arranged to extend forwardly to embrace an upwardly facing top portion 101T of the shoulder 101 of a child 100 seated on juvenile vehicle seat 12 as suggested in FIG. 1. Each longer top leg 312 includes a rearward section having a forward end coupled to a rearward end of the forward section and a rearward end mounted on seat back 14 of juvenile vehicle seat 12 for pivotable movement about a horizontal strip-pivot axis 31A between a lowered position associated with an untensioned companion shoulder strap 21 and a raised position associated with a tensioned companion shoulder strap 21 as suggested in FIG. 1. Second fulcrum strip 32 of harness tightener 17 has a size and shape that is the same as first fulcrum strip 31.

Figure 2:
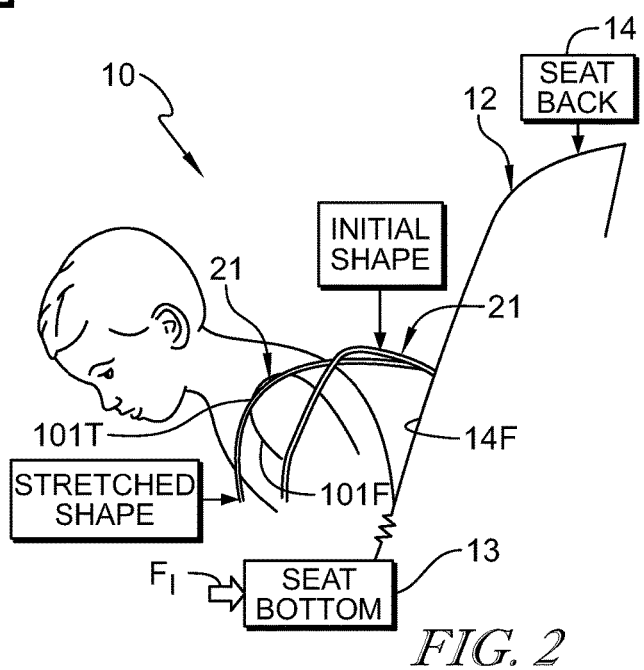
FIG. 2 is a view of the first shoulder strap and the juvenile vehicle seat shown in FIG. 1 but with the first fulcrum strip removed and showing (1) the initial shape of a first shoulder strap embracing the shoulder of a seated child (shown in phantom) before application of an external force $F_I$ to the juvenile vehicle seat as suggested in FIGS. 1 and (2) the stretched shape of the first shoulder strap embracing the shoulder of the same seated child (shown in solid) during application of an external force $F_I$ to the juvenile vehicle seat.

First fulcrum strip 31 of harness tightener 17 functions in accordance with the present disclosure to embrace forward and top portions 101F, 101T of the first shoulder 101 of the child 100 seated on juvenile vehicle seat 12, when that child 100 is restrained by child-restraint harness 16 in a seated position on juvenile vehicle seat 12 as suggested in FIG. 1. When an external impact force $F_I$ (shown in phantom) is applied to juvenile vehicle seat 12 as suggested in FIG. 1, first fulcrum strip 31 of harness tightener 17 pivots about horizontal strip-pivot axis 31A (or otherwise moves relative to seat back 14 and upwardly from seat bottom 13 from the lowered position (shown in solid) to the raised position (shown in phantom) to apply a tensioning force $T_F$ to an upper portion 21U of first shoulder strap 21 so that first shoulder strap 21 continues to hold child 100 in substantial contact with or close proximity to a forwardly facing surface 14F of seat back 14 of juvenile vehicle seat 12 so as to minimize head excursion in a forward facing harness car seat. In contrast, if first fulcrum strip 31 is decoupled from the upper portion 21U of first shoulder strap 21 as suggested diagrammatically in FIG. 2, the untensioned first shoulder strap 21 may move away from seat back 14 to allow some separation of the shoulders 101, 102 of the seated child 100 away from forwardly facing surface 14F of seat back 14. Second fulcrum strip 32 of harness tightener 17 functions in the same way as first fulcrum strip 31 to tension second shoulder strap 22 when juvenile vehicle seat 12 is exposed to an external impact force $F_I$.

In accordance with the present disclosure, first and second fulcrum strips 31, 32 of harness tightener 17 are structural members that are coupled to the first and second shoulder straps 21, 22 of a child-restraint harness 16 such as a five-point harness. First and second fulcrum strips 31, 32 wrap over the shoulders 101, 102 of a child 100 seated on juvenile vehicle seat 12 to create fulcrums that match the shoulders 101, 102 (in contrast to conventional car seats that use a harness position that is at or slightly above the shoulders of the seated child) and can only move relative to a strip-pivot axis (e.g., 31A) provided behind the shoulders 101, 102. Any movement of shoulders 101, 102 of child 100 away from seat back 14 during exposure of juvenile vehicle seat 12 to an external impact $F_I$ causes upward rotation of the first and second fulcrum strips 31, 32 about strip-pivot axis 31A thereby tightening the shoulder straps 101, 102 of the child-restraint harness 16 better to restrain the child 100 seated in juvenile vehicle seat 12.

The invention claimed is:

1. A child restraint comprising
a juvenile vehicle seat including a seat bottom and a seat back extending upwardly from the seat bottom and having a forwardly facing surface facing toward the seat bottom,
a child-restraint harness coupled to the juvenile vehicle seat and configured to include first and second shoulder straps adapted to wrap over shoulders of a child seated on the seat bottom of the juvenile vehicle seat, and
a harness tightener including a first fulcrum strip mounted on the seat back for pivotable movement above the seat bottom about a horizontal strip-pivot axis for upward movement away from the seat bottom from a lowered position to a raised position to apply tension to the first shoulder strap during exposure of the juvenile vehicle seat to an external impact force to cause lateral movement of the first shoulder strap relative to the seat back to be minimized so that lateral movement of a first shoulder of a child seated on the seat bottom and restrained by the child-restraint harness away from the seat back is limited
wherein the first fulcrum strip is arranged to extend through a forwardly facing surface of the seat back.

2. A child restraint comprising
a juvenile vehicle seat including a seat bottom and a seat back extending upwardly from the seat bottom and having a forwardly facing surface facing toward the seat bottom,
a child-restraint harness coupled to the juvenile vehicle seat and configured to include first and second shoulder straps adapted to wrap over shoulders of a child seated on the seat bottom of the juvenile vehicle seat, and
a harness tightener including a first fulcrum strip mounted on the seat back for pivotable movement above the seat bottom about a horizontal strip-pivot axis for upward movement away from the seat bottom from a lowered position to a raised position to apply tension to the first shoulder strap during exposure of the juvenile vehicle seat to an external impact force to cause lateral movement of the first shoulder strap relative to the seat back to be minimized so that lateral movement of a first shoulder of a child seated on the seat bottom and restrained by the child-restraint harness away from the seat back is limited,
wherein the first fulcrum strip is L-shaped and includes a short front leg arranged to extend downwardly to embrace a forwardly facing portion of a first shoulder of a child seated on the seat bottom and restrained by the child-restraint harness and also includes a relatively longer top leg having a forward section coupled to an upper end of the front leg and arranged to extend forwardly to embrace an upwardly facing portion of the first shoulder of a child seated on the seat bottom and a rearward section mounted on the seat back for pivotable movement about the horizontal strip-pivot axis.

3. The child restraint of claim 2, wherein the first fulcrum strip is arranged to lie between the first shoulder strap and the first shoulder of the child seated on the juvenile vehicle seat and restrained by the child-restraint harness.

4. The child restraint of claim 2, wherein the first fulcrum strip is made of or relatively rigid material to maintain an L-shaped profile during movement relative to the seat back about the horizontal strip-pivot axis from the lowered position to the raised position.

5. The child restraint of claim 2, wherein the first fulcrum strip is formed to cause the short front leg and the relatively longer to top leg to align with two upwardly facing perimeter surfaces of an isosceles triangle.

6. The child restraint of claim 1, wherein the harness tightener further includes a second fulcrum strip mounted on the seat back for pivotable movement above the seat bottom about a horizontal strip-pivot axis for upward movement away from the seat bottom from a lowered position to a raised position to apply tension independently to the second shoulder strap during exposure of the juvenile vehicle seat to the external impact force to cause lateral movement of the second shoulder strap relative to the seat back to be minimized so that lateral movement of a second shoulder of a child seated on the seat bottom and restrained by the child-restraint harness away from the seat back is limited.

7. A child restraint comprising
a juvenile vehicle seat including a seat bottom and a seat back extending upwardly from the seat bottom and having a forwardly facing surface facing toward the seat bottom,
a child-restraint harness coupled to the juvenile vehicle seat and configured to include first and second shoulder straps adapted to wrap over shoulders of a child seated on the seat bottom of the juvenile vehicle seat, and
a harness tightener including a first fulcrum strip mounted on the seat back for pivotable movement above the seat bottom about a horizontal strip-pivot axis for upward movement away from the seat bottom from a lowered position to a raised position to apply tension to the first shoulder strap during exposure of the juvenile vehicle seat to an external impact force to cause lateral movement of the first shoulder strap relative to the seat back to be minimized so that lateral movement of a first shoulder of a child seated on the seat bottom and restrained by the child-restraint harness away from the seat back is limited,
wherein the harness tightener further includes a second fulcrum strip mounted on the seat back for pivotable movement above the seat bottom about a horizontal strip-pivot axis for upward movement away from the seat bottom from a lowered position to a raised position to apply tension independently to the second shoulder strap during exposure of the juvenile vehicle seat to the external impact force to cause lateral movement of the second shoulder strap relative to the seat back to be minimized so that lateral movement of a second shoulder of a child seated on the seat bottom and restrained by the child-restraint harness away from the seat back is limited and wherein each of the first and second fulcrum strip is L-shaped and includes a short front leg arranged to extend downwardly toward the seat bottom and a relatively longer top leg arranged to extend rearwardly from an upper end of the short front leg to a companion horizontal strip-pivot axis.

8. The child restraint of claim 7, wherein the short front leg of the first fulcrum strip includes a rearwardly facing surface arranged to provide means for engaging a forwardly facing portion of the first shoulder of a seated child seated on the seat bottom and restraint by the child-restraint harness, the relatively long top leg of the first fulcrum strip includes a downwardly facing surface arranged to provide means for engaging an upwardly facing portion of the second shoulder of the seated child, the short front leg of the second fulcrum strip includes a rearwardly facing surface arranged to provide means for engaging a forwardly facing portion of the second shoulder of a seated child seated on the seat bottom and restraint by the child-restraint harness, and the relatively long top leg of the second fulcrum strip includes a downwardly facing surface arranged to provide means for engaging an upwardly facing portion of the second shoulder of the seated child.

9. A child restraint comprising
a juvenile vehicle seat including a seat bottom and a seat back extending upwardly from the seat bottom,
a child-restraint harness coupled to the juvenile vehicle seat and configured to include first and second shoulder straps adapted to wrap over shoulders of a seated child seated on the seat bottom of the juvenile vehicle seat, and
a harness tightener configured to lie in close proximity to shoulders of the seated child and provide strap-tensioner means for applying tension to the first and second shoulder straps during exposure of the juvenile vehicle seat to an external impact force so that the seated child remains substantially in an upright position in contact with or in closely confronting relation to the seat back.

10. The child restraint of claim 9, wherein the harness tightener includes a first fulcrum strip coupled to the first shoulder strap and pivotably coupled to the seat back and a second fulcrum strip coupled to the second shoulder strap and pivotably coupled to the seat back.

11. The child restraint of claim 10, wherein the first fulcrum strip is made of or relatively rigid material to maintain an L shaped profile during movement relative to the seat back about the horizontal strip-pivot axis from the lowered position to the raised position.

12. A child restraint comprising
a juvenile vehicle seat including a seat bottom and a seat back extending upwardly away from the seat bottom,
a child-restraint harness coupled to the juvenile vehicle seat and configured to include first and second shoulders of a seat child seated on the seat bottom of the juvenile vehicle seat, and
a harness tightener coupled to the first and second shoulder belts and to a forwardly facing portion of the seat back and configured to provide means for lifting upper portions of the first and second shoulder straps upwardly away from the seat bottom to move lower portions of the first and second shoulder straps closer to the forwardly facing portion of the seat back to tighten the shoulder straps against an upper torso of the seated child.

13. The child restraint of claim 12, wherein the harness tightener includes a first fulcrum strip coupled to the first shoulder strap and pivotably coupled to the seat back and a second fulcrum strip coupled to the second shoulder strap and pivotably coupled to the seat back.

14. The child restraint of claim 13, wherein the first fulcrum strip is made of or relatively rigid material to maintain an L shaped profile during movement relative to the seat back about the horizontal strip-pivot axis from the lowered position to the raised position.

* * * * *